(12) United States Patent
Akiyama et al.

(10) Patent No.: US 12,153,946 B2
(45) Date of Patent: Nov. 26, 2024

(54) REMOTE WORK SUPPORTING APPARATUS AND METHOD

(71) Applicant: Hitachi, Ltd., Tokyo (JP)

(72) Inventors: Hayato Akiyama, Tokyo (JP); Akira Matsui, Tokyo (JP)

(73) Assignee: HITACHI, LTD., Tokyo (JP)

( * ) Notice: Subject to any disclaimer, the term of this patent is extended or adjusted under 35 U.S.C. 154(b) by 547 days.

(21) Appl. No.: 17/485,551

(22) Filed: Sep. 27, 2021

(65) Prior Publication Data

US 2022/0188141 A1 Jun. 16, 2022

(30) Foreign Application Priority Data

Dec. 16, 2020 (JP) ................................. 2020-208095

(51) Int. Cl.
*G06F 9/455* (2018.01)
(52) U.S. Cl.
CPC ............... *G06F 9/45558* (2013.01); *G06F 2009/45591* (2013.01); *G06F 2009/45595* (2013.01)
(58) Field of Classification Search
CPC ....... G06F 9/45558; G06F 2009/45591; G06F 2009/45595
See application file for complete search history.

(56) References Cited

U.S. PATENT DOCUMENTS

| 2007/0234302 A1* | 10/2007 | Suzuki | ................ G06F 9/45558 717/136 |
| 2020/0225938 A1* | 7/2020 | Yuki | ......................... G06F 8/71 |
| 2021/0256113 A1* | 8/2021 | Stott | ..................... H04L 9/3239 |

FOREIGN PATENT DOCUMENTS

JP 2018120256 A 8/2018

* cited by examiner

*Primary Examiner* — Jacob D Dascomb
(74) *Attorney, Agent, or Firm* — MATTINGLY & MALUR, PC

(57) ABSTRACT

There is provided a remote work supporting apparatus and method capable of checking work content of each operator and thereby supporting remote work while preventing the occurrence of human errors. A remote work supporting system for supporting work for a target computer apparatus to be executed remotely by a plurality of operators, and a remote work supporting method executed by the remote work supporting system are designed to: create virtual machines for providing a virtual computer environment for the target computer apparatus by respectively associating the virtual machines with the respective operators and provide each of the created virtual machines to each of the corresponding operators; and monitor respective pieces of work content regarding the virtual machines corresponding to the respective operators, presume correct work content from among the respective pieces of work content, and cause the presumed work content to be reflected in the target computer apparatus.

5 Claims, 15 Drawing Sheets

FIG. 3

USER TABLE 46

| # | USER ID | PASSWORD |
|---|---------|----------|
| 1 | user1 | abcdef |
| 2 | user2 | 123456 |
| ... | ... | ... |

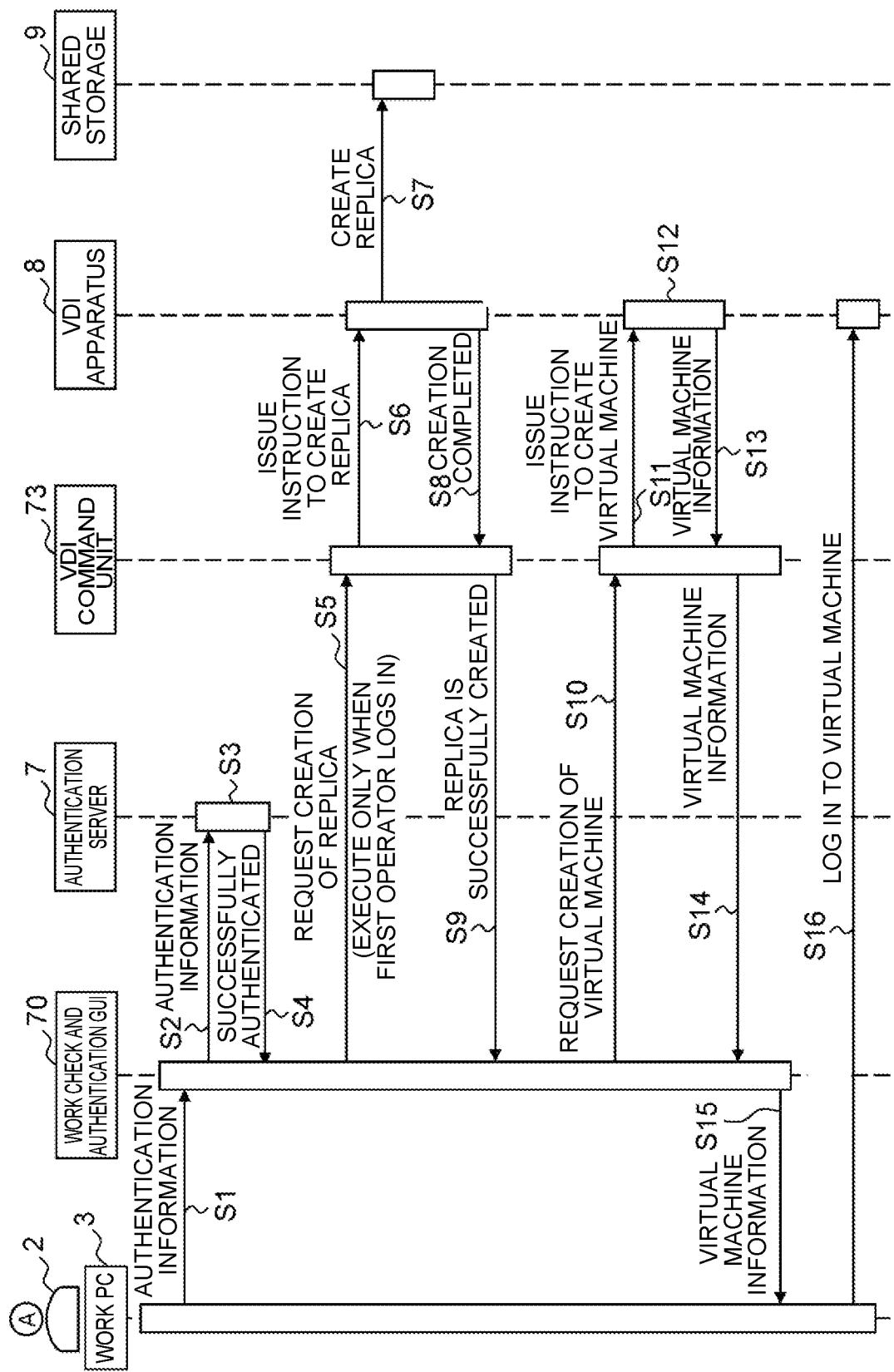

FIG. 11

USER TABLE_95

| # | USER ID | PASSWORD | THE NUMBER OF COMPARISONS | THE NUMBER OF MATCHES |
|---|---------|----------|---------------------------|------------------------|
| 1 | user1 | abcdef | 10 | 6 |
| 2 | user2 | 123456 | 10 | 5 |
| ... | ... | ... | ... | ... |

REMOTE WORK SUPPORTING APPARATUS AND METHOD

CROSS-REFERENCE TO RELATED APPLICATION

The present application claims priority from Japanese application JP2020-208095, filed on Dec. 16, 2020, the contents of which is hereby incorporated by reference into this application.

TECHNICAL FIELD

The present invention relates to a remote work supporting apparatus and method and is particularly suited for application to a remote work supporting apparatus for supporting remote work which requires input checking.

BACKGROUND ART

When updating a customer's active system, it is common for a plurality of operators to go over to the customer, verify their own identities, and proceed with work while performing a pair check. However, currently, it is difficult for the operators to visit the customer's facility due to the influence of the worldwide spread of the COVID-19, it is desired to construct an environment where the operator(s) can update the customer's active system remotely from their home or office.

As conventional technologies to remotely operate a computer apparatus, a remote desktop, VNC (Virtual Network Computing), and so on are known. These technologies such as the remote desktop and the VNC are technologies to make a target computer apparatus operable from a client by displaying a screen, which is displayed on a display of the target computer apparatus to be operated, in the client's screen operated by the operator.

Incidentally, PTL 1 indicated below discloses that: when an operator and a checker work as a pair during work to set settings to the active system, checker is also made to perform the setting work as assistant operators and respective inputs of the operators and the checker are compared with each other; and only if input values of all the operators match each other, the input values are reflected in the settings of the active system.

CITATION LIST

Patent Literature

PTL 1: Japanese Patent Application Laid-Open (Kokai) Publication No. 2018-120256

SUMMARY OF THE INVENTION

Problems to be Solved by the Invention

However, the remote desktop is designed on the premise that an OS (Operating System) of the target computer apparatus to be operated is Windows (a registered trademark of Microsoft Corporation); and the remote desktop has such a problem that the number of persons who can access the computer apparatus simultaneously is only two at maximum.

Also, regarding the VNC, it is necessary to install VNC software to both the client and the target computer apparatus to be operated and there is another problem that it is further necessary to develop software with an expanded RFB (Remote Frame Buffer) protocol in order for a plurality of persons to remotely operate one computer apparatus simultaneously.

Furthermore, there is another problem that even under the environment where the remote desktop and the VNC can be used, if each operator performs work at each separate location, it is difficult to proceed with the work while performing the pair check and it is thereby impossible to prevent the occurrence of human errors.

The present invention was devised in consideration of the above-described circumstances and aims at proposing a remote work supporting apparatus and method capable of solving the problems at once and supporting the remote work while preventing the occurrence of the human errors.

Means to Solve the Problems

In order to solve the above-described problems, there is provided according to an aspect of the present invention a remote work supporting system for supporting work for a target computer apparatus to be executed remotely by a plurality of operators, wherein the remote work supporting system includes: a virtual machine providing apparatus that creates virtual machines for providing a virtual computer environment for the target computer apparatus by respectively associating the virtual machines with the respective operators and provides each of the created virtual machines to each of the corresponding operators; and a remote work supporting apparatus that monitors respective pieces of work content regarding the virtual machines corresponding to the respective operators, presumes correct work content from among the respective pieces of work content, and causes the presumed work content to be reflected in the target computer apparatus.

Furthermore, there is provided according to another aspect of the present invention a remote work supporting method executed by a remote work supporting system for supporting work for a target computer apparatus to be executed remotely by a plurality of operators, wherein the remote work supporting method includes: a first step of creating virtual machines for providing a virtual computer environment for the target computer apparatus by respectively associating the virtual machines with the respective operators and providing each of the created virtual machines to each of the corresponding operators; and a second step of monitoring respective pieces of work content regarding the virtual machines corresponding to the respective operators, presuming correct work content from among the respective pieces of work content, and causing the presumed work content to be reflected in the target computer apparatus.

ADVANTAGEOUS EFFECTS OF THE INVENTION

Since the work content of each operator can be checked according to the present invention, it is possible to implement the remote work supporting apparatus and method capable of supporting the remote work while preventing the occurrence of the human errors.

BRIEF DESCRIPTION OF DRAWINGS

FIG. 3 is a chart illustrating a structure example of a user table according to the first embodiment;

FIG. 5 is a sequence diagram illustrating a processing flow in an authentication phase;

FIG. 11 is a chart illustrating a structure example of a user table according to a second embodiment;

DESCRIPTION OF EMBODIMENTS

One embodiment of the present invention will be explained in detail with reference to the drawings.

Figure 1:
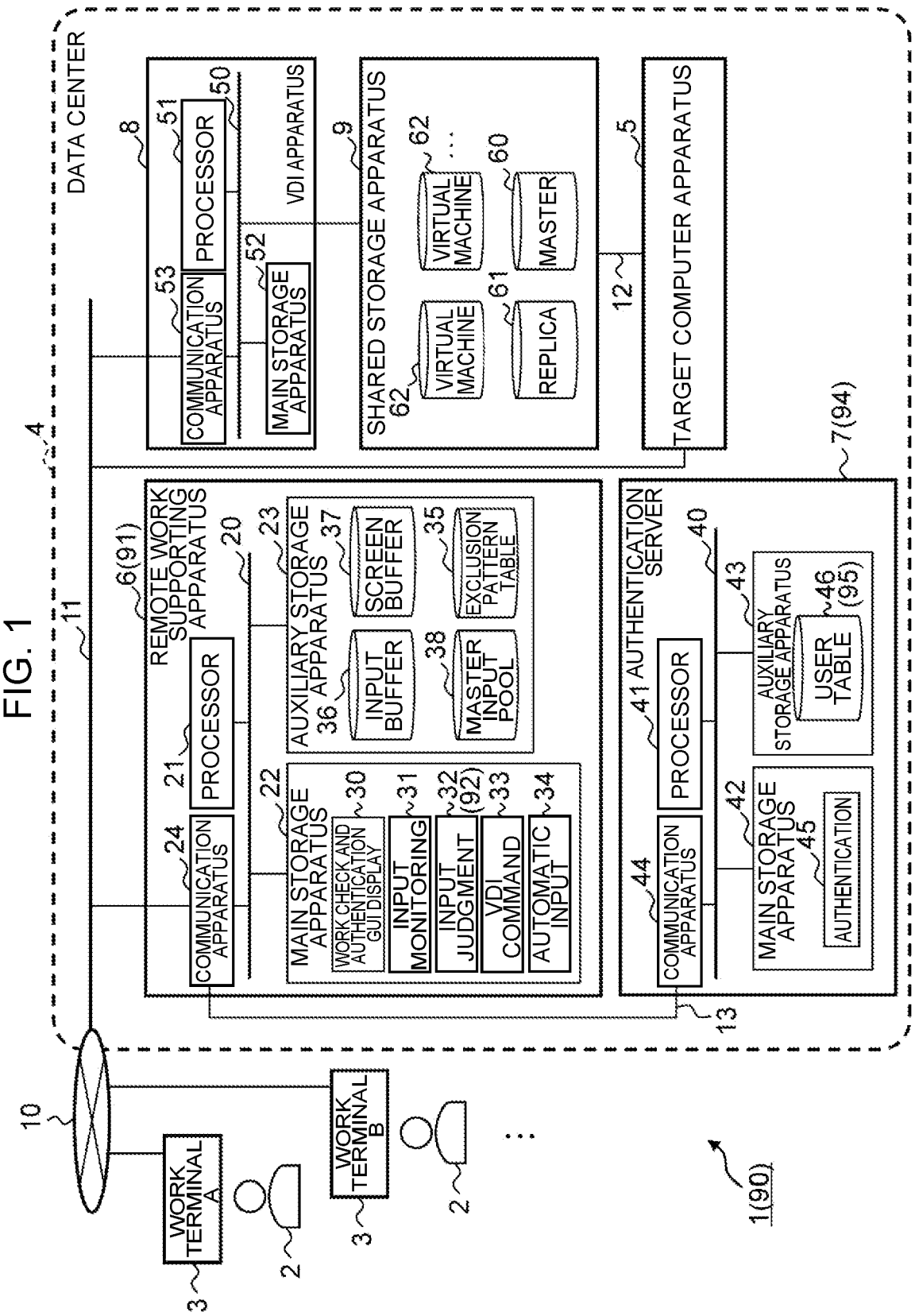
FIG. 1 is a block diagram illustrating an overall configuration of a remote work supporting system according to first and second embodiments.

(1) First Embodiment (1-1) Configuration of Remote Work Supporting System According to this Embodiment Referring to FIG. 1, the reference numeral 1 represents a remote work supporting system according to this embodiment as a whole. This remote work supporting system 1 is a system for supporting the work of an operator(s) 2 to remotely update a customer's active system (hereinafter referred to as a "target computer apparatus") 5 installed at a data center 4.

The remote work supporting system 1 is configured by including a plurality of work terminals 3 as well as the target computer apparatus 5, a remote work supporting apparatus 6, an authentication server 7, a VDI apparatus 8, and a shared storage apparatus 9 which are respectively provided within the data center 4.

The work terminal 3 is a computer apparatus used by the operator 2 to perform the work to update the target computer apparatus 5 and is configured of, for example, a notebook-type or desktop-type personal computer device. The work terminal 3 is coupled to an internal network 11 inside the data center 4 via a wide area network 10 such as the Internet.

The target computer apparatus 5 is a computer apparatus which is a work target of the update work by the operator 2. The target computer apparatus 5 is coupled to the internal network 11 installed inside the data center 4 and is coupled to the shared storage apparatus 9 via a specified communication path 12 such as a cable.

The remote work supporting apparatus 6: is a server apparatus equipped with a remote work supporting function described later that supports the operator 2 to remotely update the target computer apparatus 5 by using their own work terminal 3; and is coupled to the target computer apparatus 5 and the VDI apparatus 8 via the internal network 11 inside the data center 4 and is also coupled to the authentication server 7 via a specified communication path 13 such as a cable.

The remote work supporting apparatus 6 is configured by including a processor 21, a main storage apparatus 22, an auxiliary storage apparatus 23, and a communication apparatus 24 which are coupled to each other via an internal bus 20.

The processor 21 is a device that controls the operations of the entire remote work supporting apparatus 6. Moreover, the main storage apparatus 22 is configured of, for example, a volatile semiconductor memory and is used as a work memory for the processor 21. The main storage apparatus 22 stores various kinds of programs and data which are loaded from the auxiliary storage apparatus when activating the remote work supporting apparatus 6 or whenever necessary. A work check and authentication GUI (Graphical User Interface) display program 30, an input monitoring program 31, an input judgment program 32, a VDI command program 33, and an automatic input program 34, which will be explained later, are also loaded into and retained in this main storage apparatus 22.

The auxiliary storage apparatus 23 is configured of, for example, a large-capacity nonvolatile storage device such as a hard disk drive, an SSD (Solid State Drive), or a flash memory and stores various kinds of programs and various kinds of data which should be retained for a long term. An exclusion pattern table 35, which will be explained later, is also stored and retained in this auxiliary storage apparatus 23. Furthermore, an input buffer 36 and screen buffer 37 which are provided for each operator 2 and will be explained later, and a master input pool 38 are defined respectively in storage areas provided by the auxiliary storage apparatus 23.

The communication apparatus 24 is configured of, for example, an NIC (Network Interface Card) and performs protocol control when the remote work supporting apparatus 6 communicates with the work terminal 3 via the wide area network 10, communicates with the VDI apparatus 8 and the target computer apparatus 5 via the internal network 11, or communicates with the authentication server 7.

The authentication server 7: is a server apparatus having a function that performs authentication when the operator 2 logs in to the VDI apparatus 8 by using the work terminal 3; and is configured by including a processor 41, a main storage apparatus 42, an auxiliary storage apparatus 43, and a communication apparatus 44 which are coupled to each other via an internal bus 40. The configurations and functions of the processor 41, the main storage apparatus 42, the auxiliary storage apparatus 43, and the communication apparatus 44 are similar to those of the processor 21, the main storage apparatus 22, the auxiliary storage apparatus 23, and the communication apparatus 24 for the remote work supporting apparatus 6, so that an explanation about them is omitted here.

The main storage apparatus 42 for the authentication server 7 stores an authentication program 45 which will be explained later; and the auxiliary storage apparatus 43 stores a user table 46.

The VDI apparatus 8: is a computer apparatus having a function that provides each operator 2 who has accessed the computer apparatus by using the work terminal 3, with a virtual desktop environment of the target computer apparatus 5; and is configured by including a processor 51, a main storage apparatus 52, and a communication apparatus 53 which are coupled to each other via an internal bus 50. The configurations and functions of the processor 51, the main storage apparatus 52, and the communication apparatus 53 are similar to those of the processor 21, the main storage apparatus 22, and the communication apparatus 24 for the remote work supporting apparatus 6, so that an explanation about them is omitted here.

The VDI apparatus 8: controls the shared storage apparatus 9 to acquire an OS, application software, and various kinds of data, which are mounted in the target computer apparatus 5, from the target computer apparatus 5 via the communication path 12; and manages these OS, application software, and various kinds of data, which have been acquired by the shared storage apparatus 9, as a master 60.

Furthermore, in response to a request from the remote work supporting apparatus 6, the VDI apparatus 8 creates a replica 61 of the master 60, creates virtual machines 62 for providing the virtual computer environment for the target computer apparatus 5 on the basis of the created replica 61 by associating the virtual machines 62 with the operators 2, respectively, and provides the work terminal 3 for each operator 2 with each relevant virtual machine 62. Then, each operator 2 executes the work to update the target computer apparatus 5 with respect to the virtual machine 62 which has been allocated to themselves in a pseudo manner. Then, the VDI apparatus 8 manages the work content of the update work, which each operator 2 executed with respect to the virtual machine 62, as a difference from the replica 61.

The shared storage apparatus 9 is configured of a large-capacity storage apparatus equipped with a plurality of hard disk drives, SSDs, or flash memories. The master 60 and the replica(s) 61 described above, and information of the virtual machines 62 which are provided to the respective operators 2 are stored in the shared storage apparatus 9 by the VDI apparatus 8.

(1-2) Remote Work Supporting Function

Next, the remote work supporting function mounted in the remote work supporting apparatus 6 will be explained. Incidentally, it is assumed in the following explanation that the plurality of operators 2 respectively execute the same update work at the same time with respect to the virtual machines 62, which are allocated to themselves, by using their own work terminals 3. It is also assumed in the following explanation that such update work is the work to input characters, for example, to input a command to a command prompt.

The remote work supporting function according to this embodiment is a function that, when the plurality of respective operators 2 perform the same update work on the target computer apparatus 5 at the same time as described above, monitors the update content of each operator 2, decides the update content presumed to be correct based on a majority decision on the update content of the respective operators 2, and causes only the decided update content to be reflected in the target computer apparatus 5.

Figure 2:
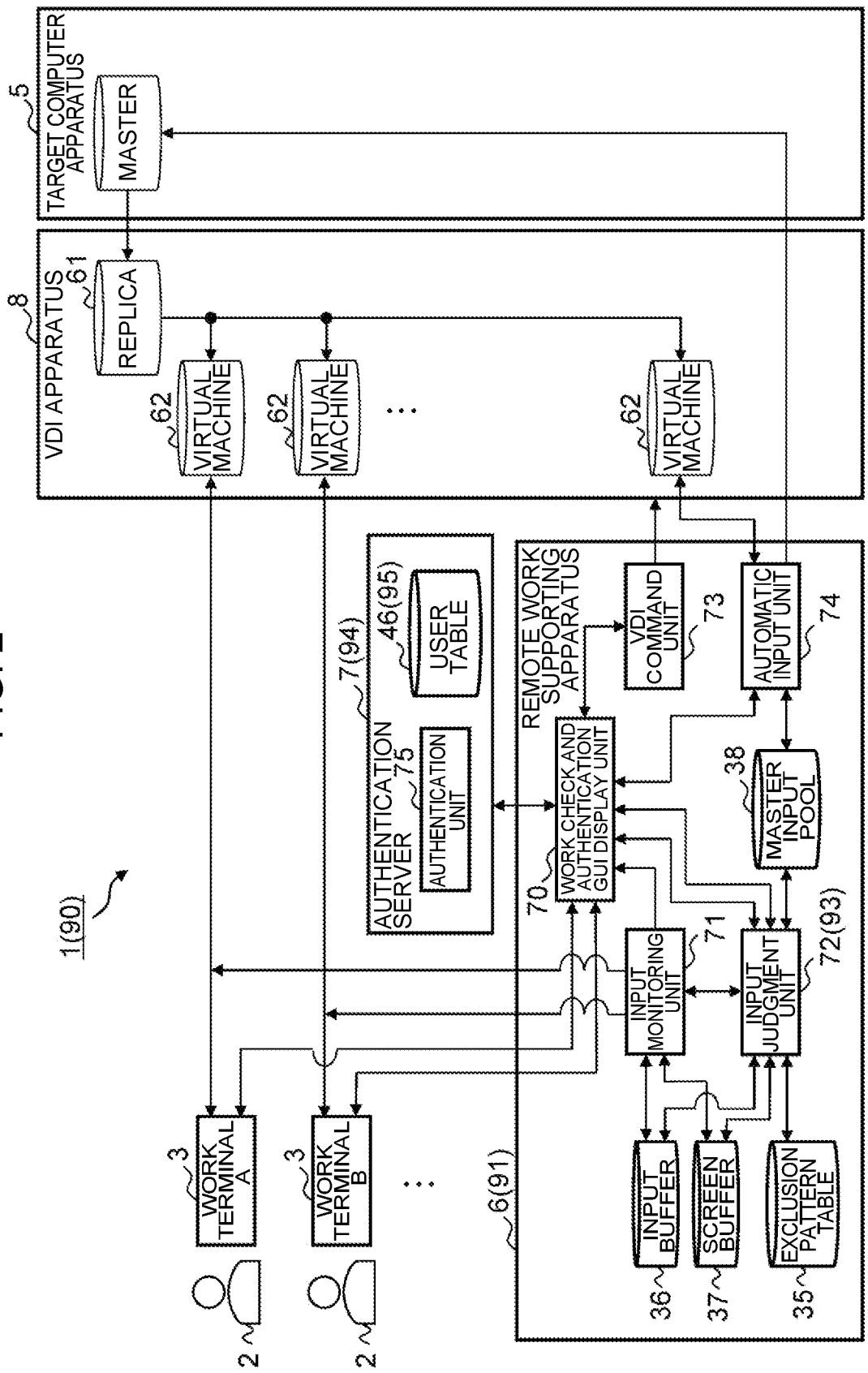
FIG. 2 is a block diagram illustrating a logical configuration of the remote work supporting system according to the first and second embodiments.

The remote work supporting apparatus 6 is provided with, as means for implementing the above-described remote work supporting function as illustrated in FIG. 2, a work check and authentication GUI display unit 70, an input monitoring unit 71, an input judgment unit 72, a VDI command unit 73, and an automatic input unit 74 as well as the input buffer 36, the screen buffer 37, the exclusion pattern table 35, and the master input pool 38; and the authentication server 7 is provided with an authentication unit 75 and the user table 46.

The work check and authentication GUI display unit 70 is a function unit that is embodied by the processor 21 (FIG. 1) for the remote work supporting apparatus 6 by executing the work check and authentication GUI display program 30 (FIG. 1) which is read to the main storage apparatus 22 (FIG. 1). This work check and authentication GUI display unit 70 has a function that displays various kinds of screens described later with reference to FIG. 4A to FIG. 4C on the work terminal 3 at necessary timing.

The work check and authentication GUI display unit 70 also has a function that requests the authentication server 7 to authenticate an operator 2 in response to a login request given from the work terminal 3 of that operator 2 in accordance with a specified operation by the operator 2, requests the VDI apparatus 8 via the VDI command unit 73 to create a virtual machine 62 for each operator 2 authenticated by the authentication server 7, and issues an instruction to the target computer apparatus 5 via the automatic input unit 74 to reflect the final work result.

Additionally, the work check and authentication GUI display unit 70 is also equipped with a function that causes the virtual machines 62 to return to their required state as necessary. Practically, if the work check and authentication GUI display unit 70 has failed to decide the update content presumed to be correct on the basis of the majority decision on the update content of the respective operators 2, it controls the VDI apparatus 8 via the VDI command unit 73 to cause the state of the virtual machine of each operator 2 to return to the state of the virtual machine 62 in which the update content presumed to be correct was reflected the last time. Furthermore, if the work check and authentication GUI display unit 70 has successfully decided the update content presumed to be correct on the basis of the majority decision on the update content of the respective operators 2, it controls the VDI apparatus 8 via the VDI command unit 73 to cause the state of the virtual machine of each operator 2, where its update content does not match the update content presumed to be correct, to return to the state of the virtual machine which was presumed to be correct the last time. By causing the state of the virtual machine 62 to return to the state of the virtual machine 62 which was presumed to be correct the last time, it enables the operator 2 to resume the update work from that state.

The input monitoring unit 71 is a function unit that is embodied by the processor 21 for the remote work supporting apparatus 6 by executing the input monitoring program 31 (FIG. 1) which is read to the main storage apparatus 22. The input monitoring unit 71 has a function that collects work information of the work performed by each operator 2 to update each corresponding virtual machine 62 by using their work terminal 3.

Specifically speaking, when the operator(s) 2 input characters to the work terminal(s) 3, the input monitoring unit 71 acquires data according to the characters transmitted from the work terminal(s) 3 to the VDI apparatus 8 (hereinafter referred to as "input data") with respect to each character and each work terminal 3 and stores these pieces of input data for each work terminal 3 in their corresponding input buffer 36.

Furthermore, the input monitoring unit 71 sequentially acquires image data of captured images or moving images of a display screen of each work terminal 3 at fixed intervals from each work terminal 3 and stores these pieces of acquired image data of each work terminal 3 in their corresponding screen buffer 37.

The input judgment unit 72 is a function unit that is embodied by the processor 21 for the remote work supporting apparatus 6 by executing the input judgment program 32 (FIG. 1) which is read to the main storage apparatus 22. The input judgment unit 72 compares the update content of the respective operators 2 on the basis of the input data of each operator 2, which has been accumulated in each input buffer 36, and judges whether there is a match or mismatch between them. Then, as a result of the comparison, the input judgment unit 72 decides the update content presumed to be correct according to a majority decision and stores the decided update content, as update data, in the master input pool 38.

Additionally, if the input judgment unit 72 has failed to decide the update content presumed to be correct as a result of the comparison, it notifies the work terminals 3 of all the operators 2, respectively, via the work check and authentication GUI display unit 70 to that effect. Also, if the input judgment unit 72 has successfully decided the update content presumed to be correct according to the majority decision, it notifies the work terminal 3 of each operator 2, regarding whom there is a mismatch between their update content and the update content, via the work check and authentication GUI display unit 70 to that effect.

The VDI command unit 73 is a function unit that is embodied by the processor 21 for the remote work supporting apparatus 6 by executing the VDI command program 33 (FIG. 1) which is read to the main storage apparatus 22. The VDI command unit 73 has a function that, upon receiving a request from the work check and authentication GUI display unit 70, issues an instruction to the VDI apparatus 8 to create a replica 61 or a virtual machine 62.

Furthermore, the automatic input unit 74 is a function unit that is embodied by the processor 21 for the remote work supporting apparatus 6 by executing the automatic input program 34 (FIG. 1) which is read to the main storage apparatus 22. The automatic input unit 74 has a function that, upon receiving a request from the work check and authentication GUI display unit 70, issues an instruction to the VDI apparatus 8 to cause the update data, which has been accumulated in the master input pool 38, to be reflected in a virtual machine for verification which will be explained later (hereinafter referred to as a "verification virtual machine") 62. Furthermore, if the operator 2 determines that there is no problem as a result of the verification using the verification virtual machine 62, the automatic input unit 74 issues an instruction to the target computer apparatus 5 to reflect the update data accumulated in the master input pool 38.

The input buffer 36 is a storage area(s) used to accumulate, as input data, information indicating the content of respective characters and key operations which are input by the operator 2 by using their work terminal 3. Also, the screen buffer 37 is a storage area(s) used to accumulate, as image data, information of moving images of screens displayed on the work terminal 3 or their images captured at certain intervals when the operator 2 is working by using their own work terminal 3. The input buffer 36 and the screen buffer 37 are provided respectively corresponding to each operator 2 as described earlier.

The master input pool 38 is a storage area(s) used to accumulate, as update data, the update content presumed to be correct by the input judgment unit 72 from among the update content of the respective operators 2. As the update data which has been accumulated in the master input pool 38 is reflected in the target computer apparatus 5, the target computer apparatus 5 is updated to a state desired by the operator 2.

The exclusion pattern table 35 is a table in which each piece of information such as a current time of day which would not influence the operations of the target computer apparatus 5 after updates even if inputs from the operators 2 differ from each other is registered as an exclusion pattern in advance. The input judgment unit 72 judges whether there is a match or mismatch between the update content of the respective operators 2 by excluding the exclusion pattern registered in this exclusion pattern table 35.

The user table 46 of the authentication server 7 is a table which stores information such as a user ID and a password of each user who is registered as an operator by an administrator by using an administrator screen 81, which will be explained later with reference to FIG. 4B, as illustrated in FIG. 3.

Furthermore, the authentication unit 75 for the authentication server 7 is a function unit that is embodied by the processor 41 for the authentication server 7 by executing the authentication program 45 (FIG. 1) which is stored in the main storage apparatus 42 (FIG. 1). The authentication unit 75 checks the user ID and password that are input to a login screen 80, which will be explained later with reference to FIG. 4A, by the operator 2 and have been transferred from the work check and authentication GUI display unit 70 for the remote work supporting apparatus 6, against the user ID and password of each user registered in the user table 46 and notifies the work check and authentication GUI display unit 70 of the check result.

(1-3) Configurations of Various Kinds of Screens

Figure 4A:
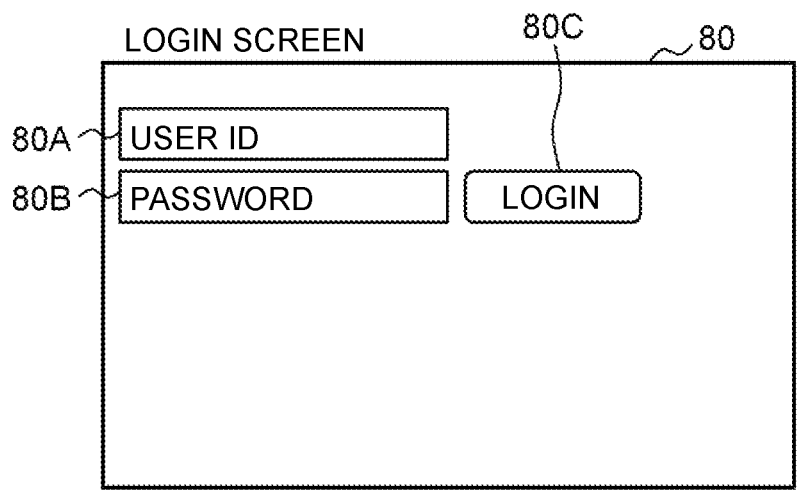
FIG. 4A is a diagram illustrating a configuration example of a login screen.

FIG. 4A illustrates the login screen 80 which can be displayed on the work terminal 3 by a specified operation. This login screen 80 is a screen for the administrator or the operator 2 to log in to this remote work supporting system 1 and is configured by including a user ID text box 80A, a password user ID text box 80B, and a login button 80C.

With this login screen 80, the user who is registered as the administrator or the operator 2 can log in to this remote work supporting system 1 by inputting their own user ID and password in the user ID text box 80A and the password user ID text box 80B and clicking the login button 80C.

Figure 4B:
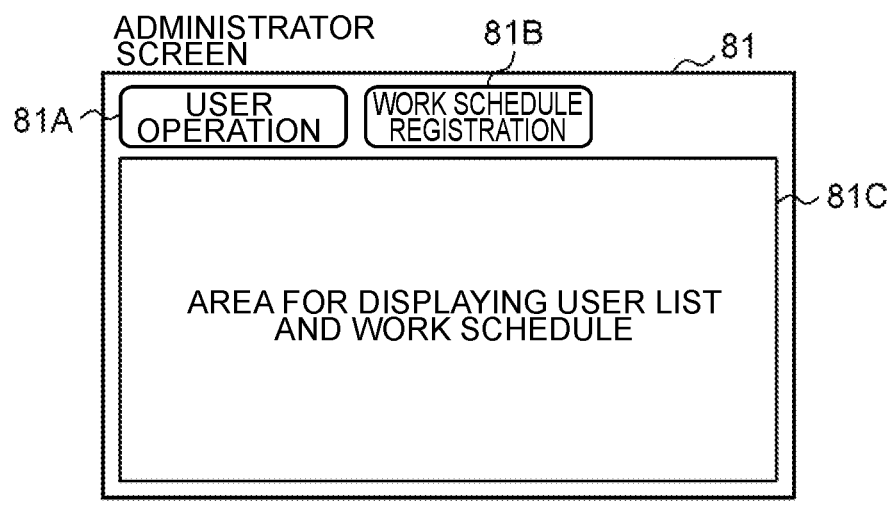
FIG. 4B is a diagram illustrating a configuration example of an administrator screen.

On the other hand, FIG. 4B illustrates the administrator screen 81. This administrator screen 81: is a screen displayed on the work terminal 3 when the administrator logs in to this remote work supporting system 1 by using their own work terminal 3; and is configured by including a user operation button 81A, a work schedule registration button 81B, and an information display area 81C.

Then, with the administrator screen 81, a list of users (which is not shown in the drawing) registered as operators 2 until then can be displayed in the information display area 81C by clicking the user operation button 81A. By using this list, the administrator can register a new user(s) as an operator(s) 2, change the user ID, password, etc. of a user(s) who has already been registered as an operator(s) 2, and delete the user(s) who has already been registered as the operator(s) 2.

Furthermore, with the administrator screen 81, a work management table, which is not shown in the drawing, for registering a work schedule such as work days and work hours of the respective users registered as the operators can be displayed in the information display area 81C by clicking the work schedule registration button 81B.

Figure 4C:
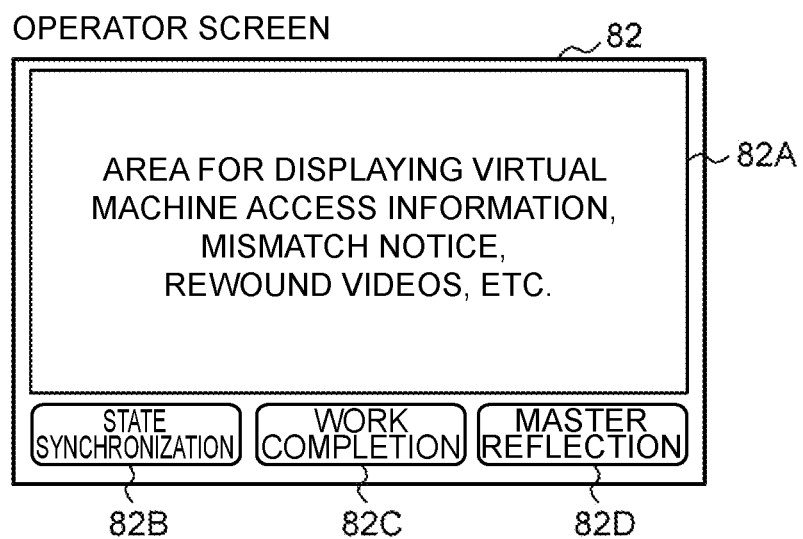
FIG. 4C is a diagram illustrating a configuration example of an operator screen.

On the other hand, FIG. 4C illustrates an operator screen 82. This operator screen 82: is a pop-up screen which pops up and is displayed on the work terminal 3 of the relevant operator 2 when the input judgment unit 72 for the remote work supporting apparatus 6 determines that the update content of the operator 2 does not match the update content of other operators; and is configured by including an information display area 82A, a state synchronization button 82B, a work completion button 82C, and a master reflection button 82D.

Then, the information display area 82A displays information for the operator 2 to access the virtual machine 62 allocated to themselves. The information display area 82A also displays, for example: a message indicating a mismatch if the update content of the operator 2 when working does not match the update content of other operators 2 (hereinafter referred to as a "mismatch message"); and moving images of a work screen or its images captured at certain intervals which have been displayed until then since the last time it was determined that the update content of the operator 2 matched the update content of other operators 2.

Then, with the operator screen 82, when such a mismatch message or the like is displayed in the information display area 82A, the state of the virtual machine 62 which is allocated to that operator 2 (that is, the virtual machine 62 with which the operator 2 performs the update work) can be returned to the state where the update content of that operator 2 matched the update content of other operators 2, by clicking the state synchronization button 82B.

Furthermore, with the operator screen 82, by clicking the work completion button 82C after the completion of all the work, it is possible to make the work terminal 3 notify the remote work supporting apparatus 6 of the completion of the work; and by clicking the master reflection button 82D after that, it is possible to issue an instruction to the remote work supporting apparatus 6 to cause all the update data, which are then accumulated in the master input pool 38, to be reflected in the target computer apparatus 5.

(1-4) A Sequence of Processing Flow Relating to Remote Work Supporting Function

Next, an explanation will be provided about a basic processing flow executed at the remote work supporting system relating to the remote work supporting function. This processing includes an authentication phase, a work phase, and a verification and master reflection phase described below.

The authentication phase is a phase from the authentication of each operator 2 by the authentication server 7 until the start of the work (including the allocation of a virtual machine(s) 62); and the work phase is a phase where each operator 2 accesses the virtual machine 62, which is allocated to them, and performs the work. Furthermore, the verification and master reflection phase is a phase where the work result is verified after the completion of the work of each operator 2 and is reflected in the target computer apparatus 5 if there is no problem. Specific processing flows of these respective phases will be explained below.

(1-4-1) Processing Flow in Authentication Phase

FIG. 5 illustrates a sequence of processing flow executed at the remote work supporting system 1 until the user registered as an operator 2 (hereinafter referred to as the "operator 2") logs in to the VDI apparatus 8 and starts the work by using their own work terminal 3.

The operator 2 performs a specified operation to cause the login screen 80 (FIG. 4A) to be displayed on their own work terminal 3, and inputs their own user ID and password to this login screen 80. The user ID and the password which are input then are transmitted as authentication information from the work terminal 3 to the remote work supporting apparatus 6 (S1).

This authentication information is transmitted to the authentication server 7 by the work check and authentication GUI display unit 70 for the remote work supporting apparatus 6 (S2). When the authentication server 7 receives this authentication information, the authentication unit 75 for the authentication server 7 (FIG. 3) compares the received authentication information with the user IDs and passwords of the respective users registered in the user table 46 (FIG. 3) (S3); and if a user with a combination of the user ID and the password which match the authentication information is registered in the user table 46, the authentication unit 75 notifies the work check and authentication GUI display unit 70 for the remote work supporting apparatus 6 of the success of the authentication (S4).

If the authenticated operator 2 is the operator 2 who firstly performed the login, the work check and authentication GUI display unit 70 which has received this notice requests the VDI command unit 73 to create a replica 61 (FIG. 3) of the master 60 for the target computer apparatus 5 (FIG. 1) (S5). Then, the VDI command unit 73 which has received this request issues an instruction to the VDI apparatus 8 to create the replica 61 of the master 60 for the target computer apparatus 5 (S6).

Furthermore, the VDI apparatus 8 which has received this instruction creates the replica 61 of the master 60 for the target computer apparatus 5, which is created in advance and stored in the shared storage apparatus 9, in the shared storage apparatus 9 (S7). Then, when the VDI apparatus 8 completes the creation of the replica 61, it notifies the VDI command unit 73 for the remote work supporting apparatus 6 to that effect. Furthermore, having received this notice, the VDI command unit 73 notifies the work check and authentication GUI display unit 70 that the replica 61 has been successfully created (S9).

The work check and authentication GUI display unit 70 which has received this notice requests the VDI command unit 73 to create a virtual machine 62 (FIG. 3) to be allocated to the operator 2 who has logged in then (S10). Furthermore, in response to such a request, the VDI command unit 73 issues an instruction to the VDI apparatus 8 to create the virtual machine 62 to be allocated to that operator 2 (S11). Consequently, the VDI apparatus 8 which has received this instruction creates the requested virtual machine 62 (S12) and notifies the VDI command unit 73 for the remote work supporting apparatus 6 of information such as an IP address for the operator 2 to access the then-created virtual machine 62, and a user ID and password to be used for such access (hereinafter collectively referred to as "virtual machine information") (S13).

The VDI command unit 73 which has received this virtual machine information transfers the received virtual machine information to the work check and authentication GUI display unit 70 (S14). Furthermore, the work check and authentication GUI display unit 70 transfers this virtual machine information to the work terminal 3 of the operator 2 who made the login in step S1 (S15).

As a result, the operator screen 82 (FIG. 4C) is displayed on the work terminal 3 and the virtual machine information is displayed in the information display area 82A (FIG. 4C). Consequently, the operator 2 logs in to their own dedicated virtual machine 62 provided by the VDI apparatus 8 by using this virtual machine information (S16) and then starts the work.

Incidentally, processing from step S5 to step S9 is executed only when the first operator 2 performs the login; and subsequently, if another operator 2 performs the login, only the processing from step S1 to step S4 and from step S10 to step S16 is executed.

(1-4-2) Processing Flow (1) in Work Phase

Figure 6:
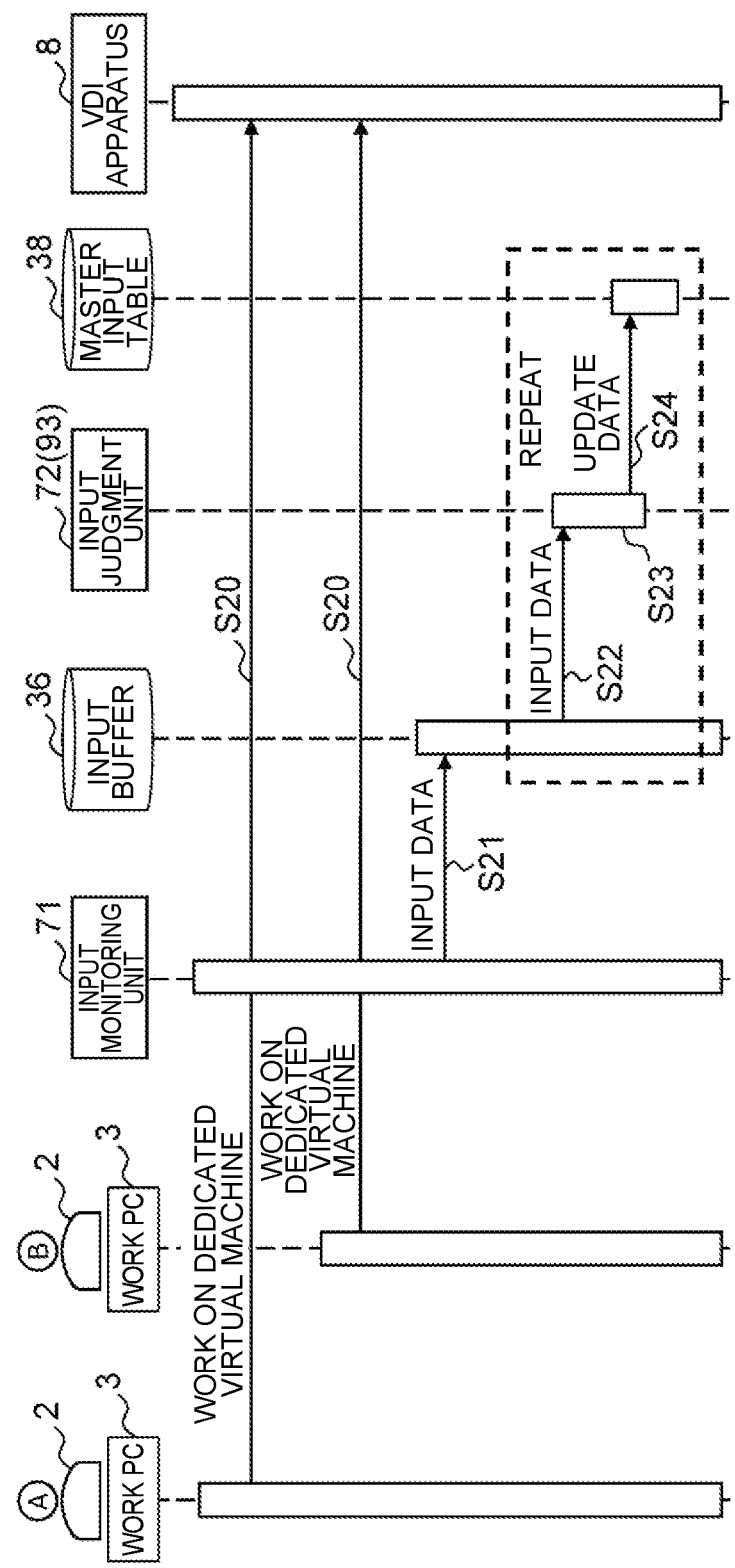
FIG. 6 is a sequence diagram illustrating a processing flow in a work phase.

FIG. 6 illustrates a sequence of processing flow which is sequentially executed at the remote work supporting apparatus 6 after each operator 2 starts the work. The remote work supporting apparatus 6 sequentially stores the update content presumed to be correct, from among the update content of the respective operators 2, as the update data in the master input pool 38 in accordance with the procedure illustrated in FIG. 6.

Practically, when each operator 2 operates their own work terminal 3 to input characters or performs the operation of function keys such as an enter key after starting the work, that input information is transmitted as input data to the VDI apparatus 8 (S20) and the corresponding virtual machines 62 are sequentially updated based on these pieces of input data (S20).

Under this circumstance, the input monitoring unit 71 for the remote work supporting apparatus 6 sequentially acquires the input data, which are respectively transmitted from the respective work terminals 3 to the VDI apparatus 8, and sequentially stores the acquired input data in the input buffers 36 for the respective operators 2. Furthermore, the input monitoring unit 71 acquires moving images of the work screen displayed on each work terminal 3 at that time or image data of its images captured at certain intervals, respectively, from each work terminal 3 and sequentially stores the acquired image data respectively in the screen buffers 37 (FIG. 3) for the respective operators 2 (S21).

In this case, when storing the acquired data in the input buffer 36, the input monitoring unit 71: sets one block of character strings which are input after the operation to press the enter key until the next operation to press the enter key (hereinafter referred to as a "section"); and divides the input data into respective sections and sequentially stores the divided input data in the input buffer 36.

Meanwhile, the input judgment unit 72: reads each of the character strings and the operation content of the function keys on a section basis from each input buffer 36 corresponding to each operator 2 who is working at that time (S22); and judges a match/mismatch between the update content of the respective operators 2 by comparing the respective characters and the operation content of the function keys with respect to each read section (S23). When doing so, the input judgment unit 72 excludes the exclusion pattern from the match/mismatch judgment target.

Then, if the update content of a majority of the operators 2 are the same as a result of the match/mismatch judgment, the input judgment unit 72 presumes such update content to be correct and stores the update content as the update data in the master input pool 38 (S24).

Furthermore, the input judgment unit 72 subsequently repeats the processing for storing the update content, which is presumed to be correct among the update content of the respective operators, in the master input pool 38 by repeating the processing from step S22 to step S24. Consequently, the update content presumed to be correct are sequentially accumulated in section units as the update data in the master input pool 38 along with the progress of the work of each operator 2.

Figure 7:
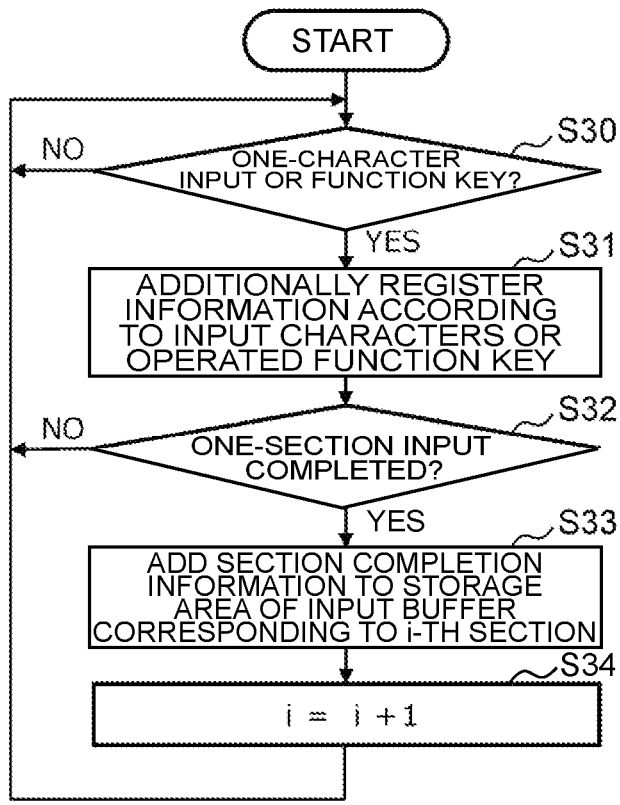
FIG. 7 is a flowchart illustrating a processing sequence for input data acquisition processing.

Incidentally, FIG. 7 illustrates specific processing content of the input monitoring unit 71 in step S21. This FIG. 7 illustrates the processing for one operator 2 and the input monitoring unit 71 executes the same processing on the respective operators 2 concurrently. Furthermore, it is assumed in the following explanation that each operator 2 performs the operation to press the enter key at the same timings while inputting characters (for example, every time they enter a one-line command prompt).

Firstly, the input monitoring unit 71 monitors the input data transmitted from the work terminal 3 of the operator 2 to the VDI apparatus 8 and waits for the operator 2 to enter one character or perform the key operation of a function key (S30); and if the input monitoring unit 71 eventually recognizes that the operator 2 has input whatever one character or operated the function key, it additionally registers character information (for example, the ASCII code of that character) of the character or operation information of the function key, as the input data, in a storage area for the i-th (i is a positive integer) section of the input buffer 36 provided corresponding to that operator 2 (S31).

Subsequently, the input monitoring unit 71 judges whether the operator 2 has performed the operation to press the enter key after inputting the character or performing the operation to press the function key as recognized in step S30 (S32); and if a negative result is obtained, the processing returns to step S30. Subsequently, every time the operator 2 inputs one character or performs the operation to press the function key, the input monitoring unit 71 repeats the processing from step S30 to step S32.

Then, when the input monitoring unit 71 eventually recognizes that the operator 2 has pressed the enter key, it stores section completion information in the storage area corresponding to the i-th section of the input buffer 36 of that operator 2 (S33). Furthermore, the input monitoring unit 71 switches the storage area for the next section in the input buffer 36 to a storage area for the (i+1)th section (S34). Furthermore, the input monitoring unit 71 returns to step S30 and then repeats the processing in step S30 and subsequent steps in the same manner.

Figure 8:
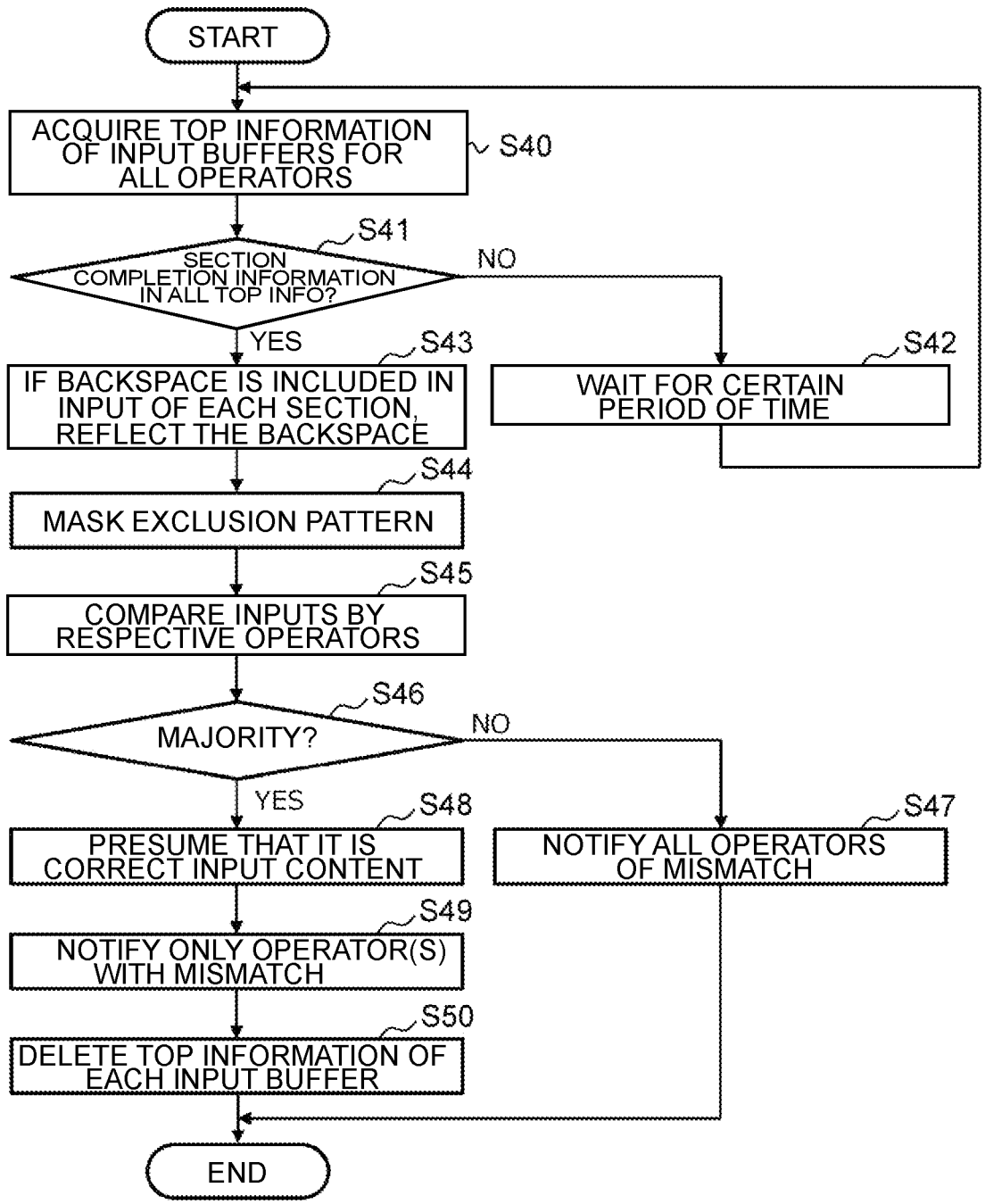
FIG. 8 is a flowchart illustrating a processing sequence for input comparison processing according to the first embodiment.

Meanwhile, FIG. 8 illustrates specific processing content of the input judgment unit 72 in step S23 in FIG. 6. Having proceeded to step S23, the input judgment unit 72 starts input comparison processing illustrated in this FIG. 8 and firstly reads and thereby acquires top information (input information stored in a storage area corresponding to the i-th section whose value is the smallest and which has not been processed yet) of each input buffer 36 corresponding to each operator 2 who is working (S40).

Subsequently, the input judgment unit 72 judges whether all pieces of the top information acquired in step S40 include the section completion information or not (S41).

To obtain a negative result in this judgment means that some operators 2 have not completed the input of that section yet. Consequently, when this happens, the input judgment unit 72 waits for a certain period of time (S42) and then returns to step S40.

On the other hand, to obtain an affirmative result in step S41 means that all the operators 2 have completed the input of that section. Consequently, under this circumstance, if the section of any one of the operators 2 includes a backspace (that is, a deletion of a mistakenly input character(s)), the input judgment unit 72 converts a character string or the like which the relevant operator 2 input, into a character string or the like in which the backspace is reflected (S43).

Next, if the character string or the like of the then target section includes the exclusion pattern, the input judgment unit 72 masks the exclusion pattern (S44). Subsequently, the input judgment unit 72 compares the update content of the respective operators in that section sequentially with respect to each one character at a time (S45) and judges whether or not the update content of a majority of the operators 2 match each other (S46).

If the input judgment unit 72 obtains a negative result in this judgment, the input judgment unit 72: notifies the work terminals 3 of all the operators 2 who are working at that time, via the work check and authentication GUI display unit 70 (FIG. 3), that the update content of the operator 2 does not match the update content of other operators 2 (S47); and then terminates this input comparison processing.

On the other hand, if the input judgment unit 72 obtains an affirmative result in the judgment of step S46, it presumes the update content which matches the update content of the majority of the operators 2 to be correct update content (S48). The thus-presumed update content is stored as the update data in the master input pool 38 in step S24 in FIG. 6.

Furthermore, the input judgment unit 72 notifies the work terminal 3 of each operator 2 whose update content does not match the update content presumed to be correct, via the work check and authentication GUI display unit 70, that the update content of the operator 2 does not match the update content of other operators 2 (S49).

Furthermore, the input judgment unit 72 deletes each piece of the top information, which was read in step S40, from each input buffer 36 (S50), and then terminates this input comparison processing.

(1-4-3) Processing Flow (2) in Work Phase

Figure 9:
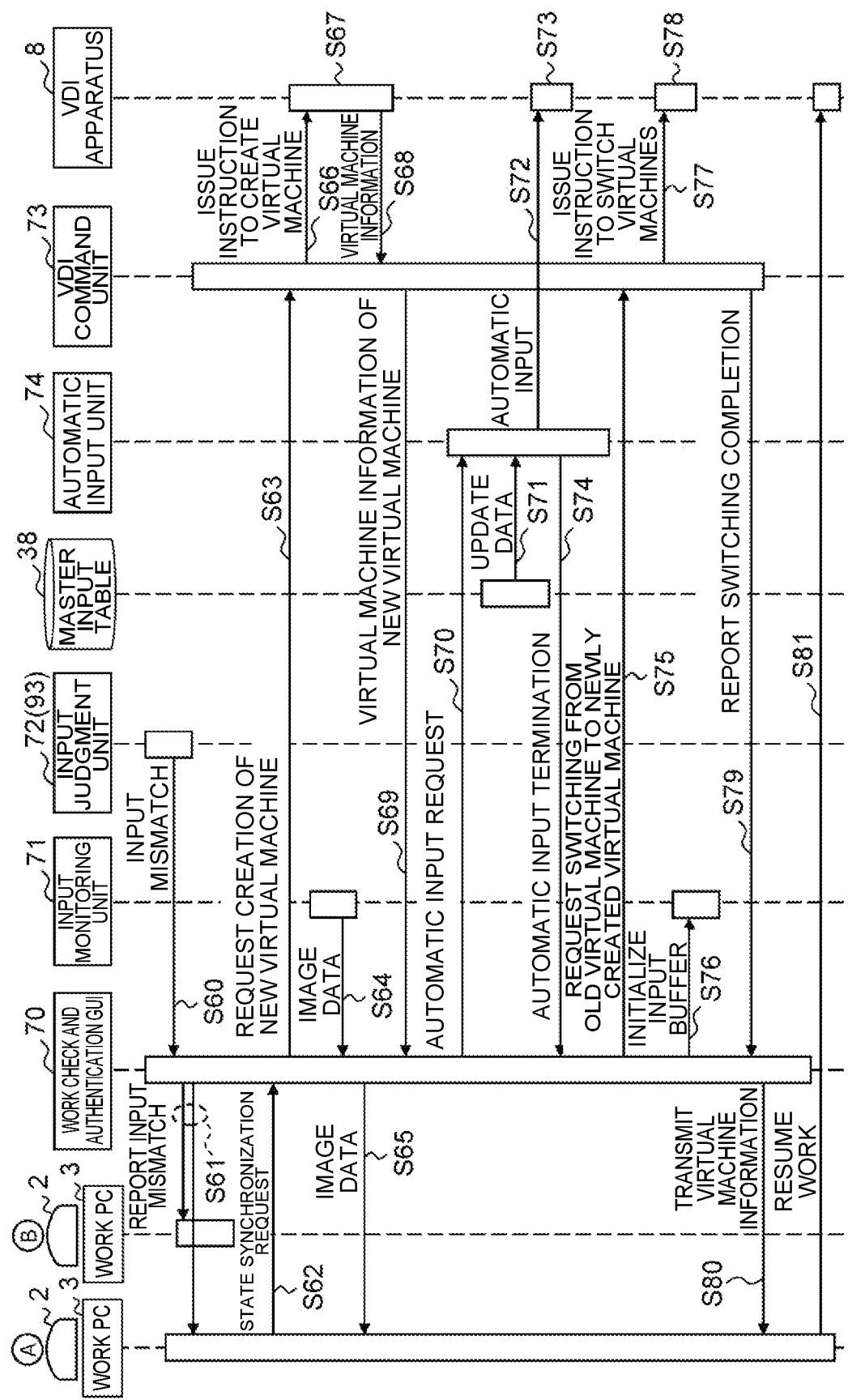
FIG. 9 is a sequence diagram illustrating a processing flow executed when an operator's update content is a mismatch in the work phase.

FIG. 9 illustrates a sequence of processing flow executed at this remote work supporting system 1 in the work phase when the input judgment unit 72 for the remote work supporting apparatus 6 notifies the relevant work terminal 3, in step S47 or step S49 in FIG. 8, via the work check and authentication GUI display unit 70 that the update content of the operator 2 does not match the update content of other operators.

Practically, if the input judgment unit 72 has failed to decide the correct update content according to the majority decision or has successfully decided the correct update content according to the majority decision in step S46 in FIG. 8, and if any operator 2 whose update content does not match that update content exists, the input judgment unit 72 identifies that operator 2 and notifies the work check and authentication GUI display unit 70 to that effect (S60).

Furthermore, after receiving such notice, the work check and authentication GUI display unit 70 notifies the work terminal 3 of the relevant operator 2 that the update content of the operator 2 does not match the update content of other operators 2 (S61). This notice will be hereinafter referred to as an "input mismatch notice."

Incidentally, the "relevant operator" herein used means: all the operators 2 if the notice then received by the work check and authentication GUI display unit 70 is a notice output from the input judgment unit 72 in step S47 in FIG. 8; and each operator 2 whose update content does not match the update content presumed to be correct if the notice then received by the work check and authentication GUI display unit 70 is a notice output from the input judgment unit 72 in step S49 in FIG. 8.

Each work terminal 3 which has received such input mismatch notice causes the operator screen 82 (FIG. 4C) on which a message to that effect (a mismatch message) is displayed in the information display area 82A (FIG. 4C) to pop up and be displayed. Then, when the operator 2 clicks the state synchronization button 82B (FIG. 4C) on the operator screen 82 in accordance with this mismatch message, each of these work terminals 3 transmits a state synchronization request to the remote work supporting apparatus 6 (S62). This operator 2 will be hereinafter referred to as a "state synchronization requesting operator 2."

The work check and authentication GUI display unit 70 for the remote work supporting apparatus 6 which has received this state synchronization request requests the VDI command unit 73 to create a new virtual machine 62 (FIG. 3) associated with each work terminal 3 which is a transmission source of the then-received state synchronization request (S63). This request will be hereinafter referred to as a "new virtual machine creation request."

Furthermore, if displaying of the display screen of the work terminal 3 during the work of the relevant section whose update content does not match the update content of other operators 2 is requested by the state synchronization requesting operator 2, the input monitoring unit 71 reads, in response to a specified operation by the state synchronization requesting operator 2, necessary image data from the screen buffer 37 corresponding to the state synchronization requesting operator 2 and transmits the read image data to that work terminal 3 via the work check and authentication GUI display unit 70 (S64, S65). Consequently, the display screen of the work terminal 3 during the work of the relevant section is displayed on the relevant work terminal 3 on the basis of this image data. Accordingly, the operator 2 can check which input was a mistake on the basis of this display screen.

Meanwhile, the VDI command unit 73 which has received the new virtual machine creation request issues an instruction to the VDI apparatus 8 to create the requested new virtual machine 62 (S66). Consequently, the requested virtual machine 62 is created by the VDI apparatus 8 in accordance with this instruction (S67). Virtual machine information of the created virtual machine (hereinafter referred to as the newly created virtual machine) 62 is transmitted to the remote work supporting apparatus 6 (S68). Also, the VDI command unit 73 for the remote work supporting apparatus 6 which has received this virtual machine information transfers the received virtual machine information to the work check and authentication GUI display unit 70 (S69).

Having received such virtual machine information, the work check and authentication GUI display unit 70 requests the automatic input unit 74 that all the update data which are then stored in the master input pool 38 be reflected in the newly created virtual machine 62 (hereinafter referred to as an "automatic input request") (S70).

Consequently, the automatic input unit 74 which has received this automatic input request: reads all the update data which are then stored in the master input pool 38 (S71); and transfers the read update data to the VDI apparatus 8 (S72). As a result, the VDI apparatus 8 causes the update data, which are then transferred from the automatic input unit 74, to be reflected in the newly created virtual machine 62 (S73). Accordingly, the state of the newly created virtual machine 62 is updated at that point in time to the state where the update content is presumed to be correct. Then, the automatic input unit 74 notifies the work check and authentication GUI display unit 70 that the processing for the automatic input request has terminated (S74).

Having received this notice, the work check and authentication GUI display unit 70 requests the VDI command unit 73 to switch between the newly created virtual machine 62 and its original virtual machine 62 (the virtual machine 62 which was allocated to the state synchronization requesting operator 2) (S75). This request will be hereinafter referred to as a "virtual machine switching request." Furthermore, along with the above, the work check and authentication GUI display unit 70 initializes the input buffer 36 which is associated with the state synchronization requesting operator 2 (S76).

The VDI command unit 73 which has received the virtual machine switching request issues an instruction to the VDI apparatus 8 to switch between the newly created virtual machine 62 and the original virtual machine 62 (S77). As a result, the VDI apparatus 8 switches the virtual machine 62 of the state synchronization requesting operator 2 to the newly created virtual machine 62, which was updated in step S73, in accordance with this instruction (S78). As a result, the VDI command unit 73 notifies the work check and authentication GUI display unit 70 that the switching of the virtual machine 62 of the state synchronization requesting operator 2 has been completed (S79).

Having received this notice, the work check and authentication GUI display unit 70 transmits the virtual machine information of the new switched virtual machine acquired in step S69 (the newly created virtual machine 62) to the work terminal 3 of the state synchronization requesting operator 2 and causes the work terminal 3 to display the virtual machine information (S80). As a result, the virtual machine information of the newly created virtual machine 62 is displayed in the information display area 82A (FIG. 4C) of the operator screen 82 (FIG. 4C) which pops up and is displayed on the work terminal 3.

Consequently, the state synchronization requesting operator 2 can subsequently access the newly created virtual machine 62 on the basis of the virtual machine information of the newly created virtual machine 62, which is then displayed in the information display area 82A of the operator screen 82, and can resume the work from the section which is currently determined to be correct (S81).

Incidentally, the aforementioned processing from step S62 to step S81 is executed for each state synchronization requesting operator 2.

(1-4-4) Processing Flow in Verification and Master Reflection Phase

Figure 10:
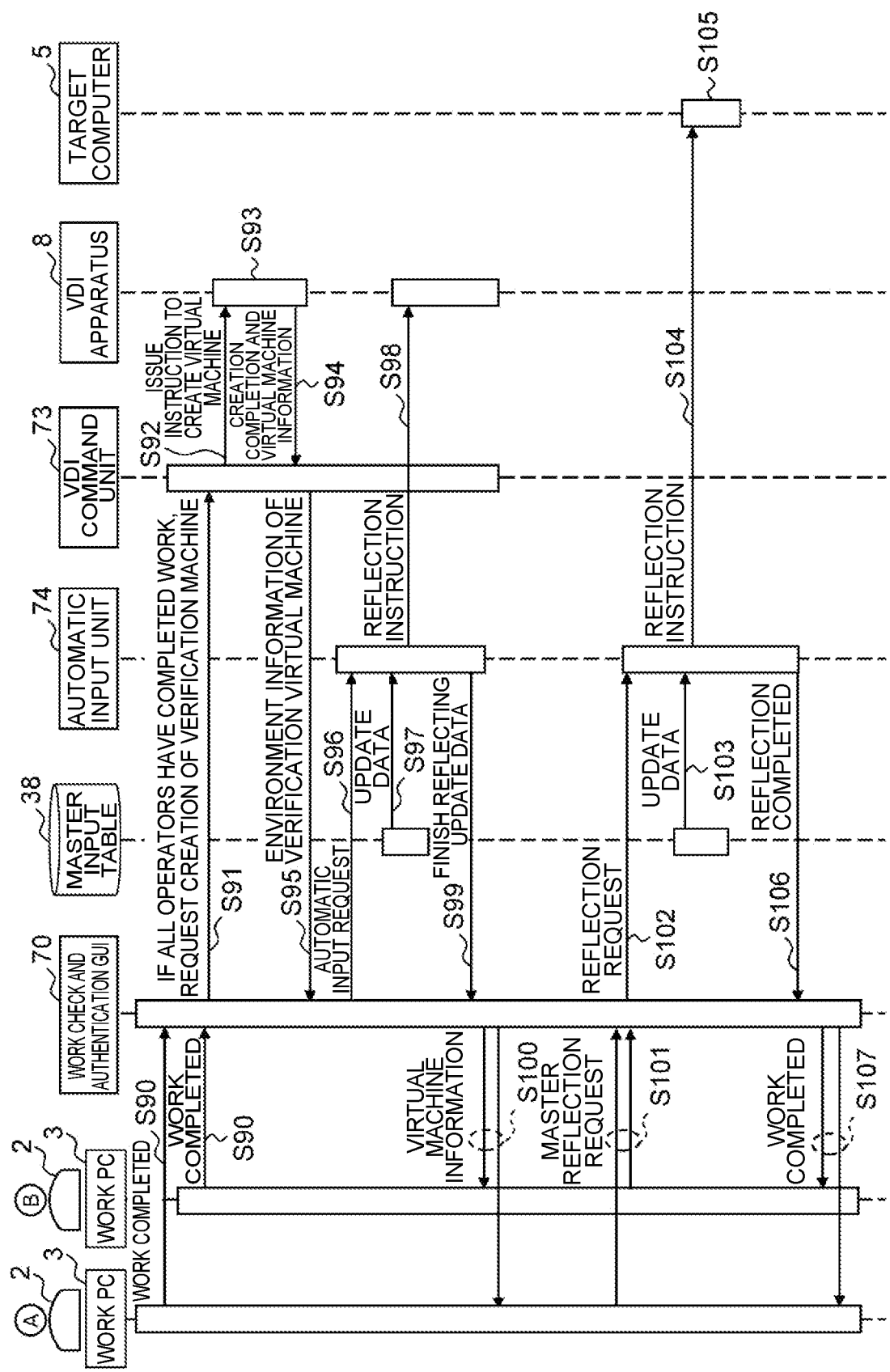
FIG. 10 is a sequence diagram illustrating a processing flow in a verification and master reflection phase.

FIG. 10 illustrates a sequence of processing flow in the verification and master reflection phase. When the work is completed with this remote work supporting system 1, each operator 2 clicks the work completion button 82C (FIG. 4C) on the operator screen 82 (FIG. 4C) which is displayed on their own work terminal 3. Then, once the work completion button 82C is clicked, the work terminal 3 transmits a work completion notice, which reports the completion of the work by the relevant operator 2, to the remote work supporting apparatus 6 (S90).

When the work check and authentication GUI display unit 70 for the remote work supporting apparatus 6 confirms that work completion notices have been transmitted from the work terminals 3 of all the operators 2, it requests the VDI command unit 73 to create a virtual machine for verification (a verification virtual machine) 62 (S91). Furthermore, when receiving the above-described request, the VDI command unit 73 issues an instruction to the VDI apparatus 8 to create a new virtual machine 62 (S92). Consequently, the VDI apparatus 8 creates the new virtual machine 62 as the verification virtual machine 62 in accordance with this instruction (S93) and transmits virtual machine information of the created verification virtual machine 62 to the remote work supporting apparatus 6 (S94).

Having received such virtual machine information, the VDI command unit 73 for the remote work supporting apparatus 6 transfers this virtual machine information, as the virtual machine information of the verification virtual machine 62, to the work check and authentication GUI display unit 70 (S95). Furthermore, when the work check and authentication GUI display unit 70 receives the virtual machine information of the verification virtual machine 62, it requests the automatic input unit 74 that all the update data which are currently stored in the master input pool 38 be reflected in the verification virtual machine 62 (S96).

Consequently, the automatic input unit 74 which has received this request: reads all the update data stored in the master input pool 38 (S97); and transmits the read update data, together with the automatic input instruction, to the VDI apparatus 8 (S98). Consequently, the VDI apparatus 8 causes this update data to be reflected in the verification virtual machine 62.

Furthermore, when the automatic input unit 74 completes reflecting the update data in the verification virtual machine 62, it notifies the work check and authentication GUI display unit 70 to that effect (S99). Then, having received the above-described notice, the work check and authentication GUI display unit 70 transmits the virtual machine information of the verification virtual machine 62, which was transmitted from the VDI command unit 73 in step S95, to the work terminals 3 of all the operators 2 (S100).

Consequently, each operator 2 can: access the verification virtual machine 62 on the basis of the virtual machine information of the verification virtual machine 62 displayed in the information display area 82A of the operator screen 82 (FIG. 4C) which is then displayed on the work terminal 3; and perform necessary verification work by using the verification virtual machine 62.

Furthermore, if it is confirmed by such verification work that there is no problem in the work which has been performed so far, each operator 2 can cause the work content, which has been worked on so far, to be reflected in the target computer apparatus 5 by clicking the master reflection button 82D (FIG. 4C) of the operator screen 82.

Practically, when the operator 2 clicks the master reflection button 82D of the operator screen 82 displayed on the work terminal 3, a master reflection request is transmitted from the work terminal 3 to the remote work supporting apparatus 6 (S101).

Then, having received such master reflection requests from the work terminals 3 of all the operators 2, the work check and authentication GUI display unit 70 for the remote work supporting apparatus 6 requests the automatic input unit 74 to cause all the update data which are then stored in the master input pool 38 (data of the update content determined to be correct by the work which has been conducted up until now) to be reflected in the target computer apparatus 5 (S102).

Furthermore, when the automatic input unit 74 receives the above-described request, it reads all the update data stored in the master input pool 38 (S103) and transmits the read update data, together with the reflection instruction, to the target computer apparatus 5 (S104). Consequently, the target computer apparatus 5 causes the update data, which have been transmitted together with the reflection instruction, to be reflected in its programs in accordance with the reflection instruction (S105). Consequently, the state of the target computer apparatus 5 is updated to the state according to the work content of each operator 2.

Subsequently, the automatic input unit 74 notifies the work check and authentication GUI display unit 70 of the completion of reflection of the update data in the target computer apparatus 5 (S106). Then, when the work check and authentication GUI display unit 70 receives the above-described request, it sends a work completion notice indicating the completion of the reflection work to each of the work terminals 3 of all the operators (S107). Consequently, the operator screen 82 (FIG. 4C) on which a message indicating the completion of reflection of the update data in the target computer apparatus 5 is displayed in the information display area 82A (FIG. 4C) pops up and is displayed on the work terminal 3 of each operator 2 based on the above-described notice.

(1-5) Advantageous Effect of this Embodiment

When each of the plurality of operators 2 performs the same update work with respect to the target computer apparatus 5 at the same time, the remote work supporting system 1 according to this embodiment as described above monitors the update content of each operator 2, decides the update content presumed to be correct according to the majority decision on the update content of the respective operators 2, and causes only the decided update content to be reflected in the target computer apparatus 5.

Therefore, the work content of each operator can be checked without having the operators 2 perform the pair check, so that it is possible to support the remote work while preventing the occurrence of human errors.

(2) Second Embodiment

Referring to FIG. 1 and FIG. 2, the reference numeral 90 represents a remote work supporting system according to a second embodiment as a whole. This remote work supporting system 90 is configured in the same manner as the remote work supporting system 1 according to the first embodiment, except that: functions of an input judgment program 92, which is stored in a main storage apparatus 22 for a remote work supporting apparatus 91, and an input judgment unit 93 which is embodied by the processor 21 by executing the input judgment program 92 are different from those of the input judgment program 32 and the input judgment unit 72 according to the first embodiment; and the structure of a user table 95 stored in an auxiliary storage apparatus 43 for an authentication server 94 is different from that of the user table 46 (FIG. 3) according to the first embodiment.

Practically, in a case of this embodiment, the user table 95 stores the number of comparisons and the number of matches for each user in addition to the user ID and the password of each registered user as illustrated in FIG. 11. "The number of comparisons" herein used means the number of times the update content of the operator 2 was compared with the update content of other operators 2 in step S23 in FIG. 6; and "the number of matches" means the number of times the update content of that operator 2 was presumed to be correct as a result of the above-described comparison.

"The number of comparisons" and "the number of matches" are updated by the authentication unit 75 (FIG. 2) for the authentication server 94 as a result of the instruction issued to the authentication server 94 (FIG. 2), via the work check and authentication GUI display unit 70 (FIG. 2), so that the input judgment unit 93 should increase "the number of comparisons" of each operator 2, whose update content was compared with the update content of other operators 2 in step S23 in FIG. 6, by just one and further increase "the number of matches" of the operator 2, whose update content was then presumed to be correct, by just one.

Meanwhile, the difference between the input judgment unit 93 according to this embodiment and the input judgment unit 72 (FIG. 2) according to the first embodiment is that the input judgment unit 93 decides the update content presumed to be correct among the update content of the respective operators 2 on the basis of the accuracy of each operator 2 which is calculated based on "the number of comparisons" and "the number of matches" regarding each operator 2 as managed by the user table 95.

Specifically speaking, the input judgment unit 93 defines that the accuracy $x_i$ of the i-th operator 2 is a value calculated according to the following expression.

[Math. 1]

$$x_i = \frac{\text{The Number of Matches of Operator } i}{\text{The Number of Comparisons of Operator } i} \quad (1)$$

Figure 12:
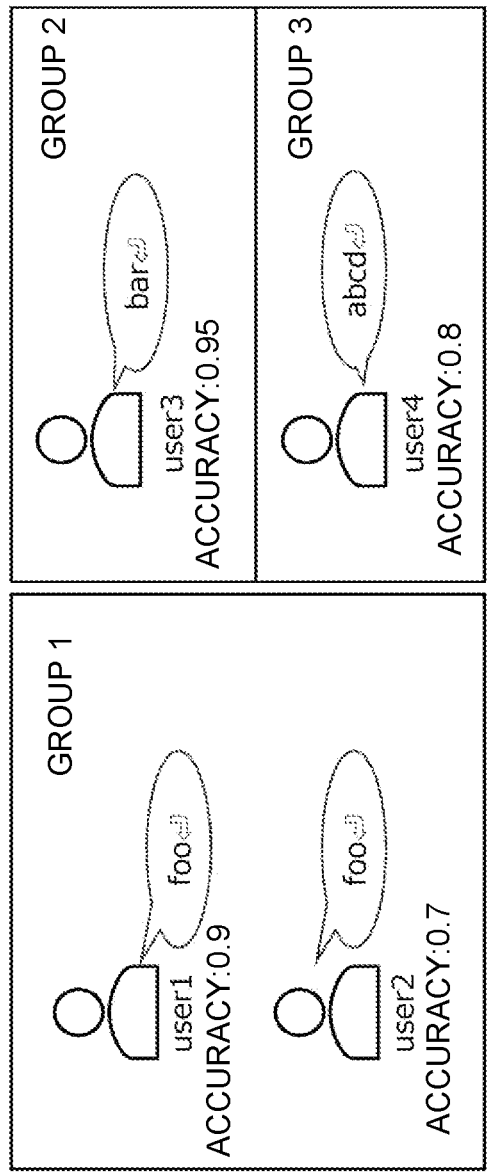
FIG. 12 is a diagram for explaining processing content of an input judgment unit according to the second embodiment.

In step S23 in FIG. 6, as illustrated in FIG. 12, the input judgment unit 93: forms groups of the operators 2 to make each operator 2 with the same update content belong to the same group (hereinafter referred to as an "operator group (s)"); and calculate reliability R of the relevant operator group with respect to each operator group according to following expression.

[Math. 2]

$$R = \frac{\prod_{i=1}^{n} x_i}{\prod_{i=1}^{n} x_i + \frac{1}{(N-1)^{n-1}} \prod_{i=1}^{n} (1 - x_i)} \quad (2)$$

Incidentally, in Expression (2), n represents the number of operators 2 belonging to the relevant operator group and N represents the total number of operator groups.

Then, the input judgment unit 93 presumes the update content of each operator 2 belonging to an operator group with the highest reliability R to be correct on the basis of the value of the thus-calculated reliability R of each operator group and registers this update content as the update data in the master input pool.

For example, in the example of FIG. 12, it is assumed that: the accuracy of an operator 2 called "user 1" is "0.9"; the accuracy of an operator 2 called "user 2" is "0.7"; the accuracy of an operator 2 called "user 3" is "0.95"; and the accuracy of an operator 2 called "user 4" is "0.8."

In this case, as illustrated in FIG. 12, the reliability R of the operator group "Group 1" constituted by "user 1" and "user 2" is "0.98"; the reliability R of the operator group "Group 2" constituted by "user 3" is "0.95"; and the reliability R of the operator group "Group 3" constituted by "user 4" is "0.80."

Therefore, in this case, it is presumed that the update content "foo" of "user 1" and "user 2" who belong to "Group 1" with the highest reliability R should be correct; and this "foo" is stored as the update data of the corresponding section in the master input pool 38 (FIG. 2).

Incidentally, when presuming the update content of each operator 2 belonging to the operator group with the highest reliability to be correct, a lower limit threshold value may be set to the highest reliability (hereinafter referred to as the "maximum reliability"). By doing so, it is possible to prevent the occurrence of an event where the update content of the operators 2 belonging to the relevant operator group may be presumed to be correct even when the maximum reliability is small.

Figure 13:
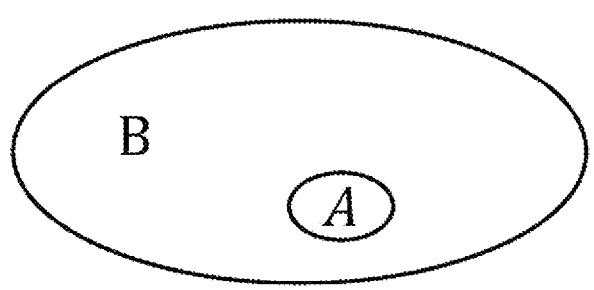
FIG. 13 is a Venn diagram for explaining the processing content of the input judgment unit according to the second embodiment.

The basis for Expression (2) is as follows. For example, assuming that in FIG. 13, Set A is a correct answer set, Set B is a complementary set of Set A, $x_i$ is the probability for user i to select A, N is the total number of groups, n is the number of users within a group, $P_1$ is the probability for all the users within a certain group to select elements of Set A, and $P_2$ is the probability for all the users in that group to select elements of Set B, the probability P for all the users within a certain group to give the same answer which is a correct answer is expressed by the following expression.

[Math. 3]

$$P = \frac{P_1}{P_1 + P_2} \quad (3)$$

In this case, the probability $P_1$ is expressed by the following expression [Math. 4].

$$P_1 = \pi_{i=1}^n x_i \quad (4)$$

The probability $P_2$ is expressed by the following expression [Math. 5].

$$P_2 = \prod_{i=1}^{n}(1-x_i) \times \frac{1}{(N-1)^{n-1}} \quad (5)$$

Accordingly, Expression (2) can be obtained by assigning Expression (4) and Expression (5) to Expression (3).

Figure 14:
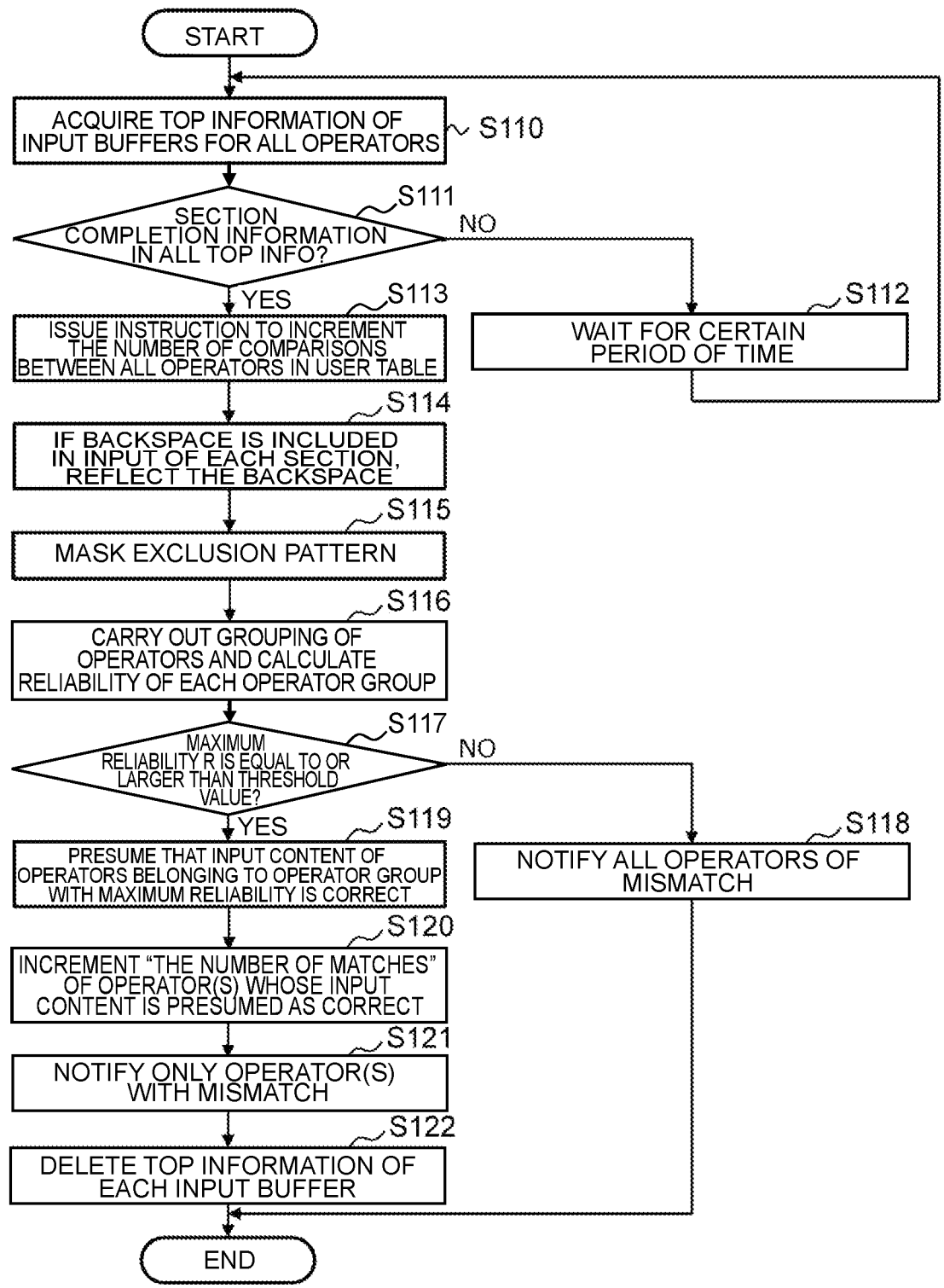
FIG. 14 is a flowchart illustrating a processing sequence for input comparison processing according to the second embodiment.

FIG. 14 illustrates specific processing content of input comparison processing according to this embodiment executed by the input judgment unit 93 in step S23 in FIG. 6 instead of the input comparison processing explained earlier with reference to FIG. 8.

Having proceeded to step S23 in FIG. 6, the input judgment unit 93 starts the input comparison processing illustrated in this FIG. 14, firstly executes processing in step S110 to step S112 in the same manner as in step S40 to step S42 in FIG. 8, and then issues an instruction to the authentication server 94 via the work check and authentication GUI display unit 70 to increment the number of comparisons of each operator 2, who is working, in the user table 95 (FIG. 11) (to increase it by one) (S113). As a result, the authentication unit 75 for the authentication server 94 increments "the number of comparisons" of each operator 2, who is working, in the user table 95.

Subsequently, the input judgment unit 93 executes processing in step S114 and step S115 in the same manner as in step S43 and step S44 in FIG. 8. Subsequently, the input judgment unit 93 forms groups of all the operators 2 who are working so as to assign the operators 2 with the same update content to the same operator group, and calculates the reliability of each operator group according to Expression (2) mentioned earlier (S116).

Next, the input judgment unit 93 judges whether or not the highest reliability (the maximum reliability) among the reliabilities of the respective operator groups calculated in step S116 is equal to or larger than the preset lower limit threshold value (S117). Then, if the input judgment unit 93 obtains a negative result in this judgment, the input judgment unit 93: notifies the work terminals 3 of all the operators 2 who are then working, via the work check and authentication GUI display unit 70 (FIG. 3), that the update content of the relevant operator 2 does not match the update content of other operators 2 (S118); and then terminates this input comparison processing.

On the other hand, if the input judgment unit 93 obtains an affirmative result in the judgment of step S117, it presumes the update content of each operator 2 belonging to the operator group whose reliability is the maximum reliability, to be the correct update content (S119). The thus-presumed update content is stored as the update data in the master input pool 38 in step S24 in FIG. 6.

Subsequently, the input judgment unit 93 issues an instruction to the authentication server 94 via the work check and authentication GUI display unit 70 to increment "the number of matches" of each operator 2 with the update content presumed to be correct (each operator 2 belonging to the operator group with the maximum reliability) in the user table 95 (S120). As a result, the authentication unit 75 for the authentication server 94 increments "the number of matches" of each operator 2 designated in the user table 95 in accordance with this instruction.

Moreover, the input judgment unit 93 notifies the work terminal of each operator 2 whose update content does not match the update content presumed to be correct, via the work check and authentication GUI display unit 70, that the update content of that operator does not match the update content of other operators 2 (S121).

Furthermore, the input judgment unit 93 deletes each piece of the top information, which was read in step S110, from each input buffer 36 (S122) and then terminates this input comparison processing.

With the remote work supporting system 90 according to this embodiment having the above-described configuration, even if the update content of the majority of the operators 2 do not match each other, it is possible to presume the update content, which is predicted to be the most correct update content, to be correct among them by deciding the update content which can be presumed to be correct from among the update content of the respective operators 2.

Accordingly, this remote work supporting system 90 can obtain the advantageous effect of being capable of more flexibly deciding the update content presumed to be correct than the first embodiment in addition to the advantageous effects which can be obtained by the remote work supporting system 1 according to the first embodiment.

(3) Other Embodiments

Incidentally, the aforementioned first and second embodiments have described the case where the work content performed by the operator(s) 2 is the work to update the target computer apparatus 5; however, the present invention is not limited to this example and the work performed by the operator 2 may be any work other than the work to update the target computer apparatus 5.

Moreover, the aforementioned first and second embodiments have described the case where one server apparatus is equipped with all the functions of the remote work supporting apparatus 6, 91; however, the present invention is not limited to this example and some or all the functions of the remote work supporting apparatus 6, 91 may be distributed to, and mounted in, a plurality of computer apparatuses coupled together via a network.

Furthermore, the aforementioned first and second embodiments have described the case where the work content of the operator(s) 2 is to input characters to the command prompt; however, the present invention is not limited to this example and, for example, the present invention can be also applied to work which enables an update by clicking a button.

Furthermore, the aforementioned first and second embodiments have described the case where the virtual machine providing apparatus that creates virtual machines 62 for providing the virtual computer environment for the target computer apparatus 5 by respectively associating the virtual machines 62 with the respective operators 2, and provides each created virtual machine 62 to each corresponding operator 2 is configured of the VDI apparatus 8 equipped with the VID function; however, the present invention is not limited to this example and the virtual machine providing apparatus can be configured of other various kinds of computer apparatuses.

Furthermore, the aforementioned first embodiment has described the case where if the update content of the majority of the operators 2 who are working match each other, the input judgment unit 72 determines that update content to be correct; however, the present invention is not limited to this example and, for example, if the update content of 60% or more or 70% or more of the operators 2 who are working match each other, the input judgment unit 72 may determine that update content to be correct; and a wide variety of other proportions can be applied as the proportion of the operators 2 presumed by the input judgment unit 72 to be correct.

Furthermore, the aforementioned second embodiment has described the case where the reliability of each operator group is calculated according to Expression (2); however, the present invention is not limited to this example and a wide variety of other arithmetic expressions can be applied.

INDUSTRIAL AVAILABILITY

The present invention can be applied to the remote work supporting system for supporting the work for the target computer apparatus to be executed remotely by the plurality of operators.

REFERENCE SIGNS LIST

1, 90: remote work supporting system
2: operator
3: work terminal
5: target computer apparatus
6, 91: remote work supporting apparatus
7, 94: authentication server
8: VDI apparatus
21, 41, 51: processor
30: work check and authentication GUI display program
31: input monitoring program
32, 92: input judgment program
33: VDI command program
34: automatic input program
35: exclusion pattern table
36: input buffer
37: screen buffer
38: master input pool
45: authentication program
46, 95: user table
60: master
61: replica
62: virtual machine
70: work check and authentication GUI display unit
71: input monitoring unit
72, 93: input judgment unit
73: VDI command unit
74: automatic input unit
80: login screen
81: administrator screen
82: operator screen

The invention claimed is:

1. A remote work supporting system for supporting work of a target computer apparatus to be executed remotely by a plurality of terminals of respective operators, the remote work supporting system comprising:
a first computer configured to create a plurality of virtual machines providing respective virtual computer environments for the target computer by respectively associating the virtual machines with the respective operators and provide each of the created virtual machines to each terminal of the corresponding operators; and
a second computer, coupled to the first computer, configured to:
receive respective update content from each of the terminals, which is input data consisting of at least a plurality of characters acquired from each terminal for updating content of the target computer,
store the received update content sequentially in one or more sections in buffers that respectively correspond to each of the operators,
for each corresponding section in each respective buffer, compare each character to determine whether the input data of the sections match each other,
upon determining a majority of the sections match each other, store the update content of the matching sections in a first storage of the second computer as update data for the target computer,
wherein update data is reflected in the target computer.

2. The remote work supporting system according to claim 1,
wherein a specific exclusion pattern is set to the update content, and
wherein the second computer is configured to, exclude the exclusion pattern upon comparing the input data of the respective operators.

3. The remote work supporting system according to claim 1,
wherein the second computer is configured to:
cause the first computer to create a virtual machine for verification,
cause the update data to be reflected in the virtual machine for verification, and
cause the update data to be reflected in the target computer after confirming that the virtual machine for verification has no problem.

4. The remote work supporting system according to claim 1,
wherein the second computer is configured to:
form groups of respective operators so that the operators with the same work content belong to the same group,
calculate a reliability for each of the groups on the basis of a number of times when the corresponding sections of the update content of each of the operators belonging to the group matches each other, and
determine the update content of the operator belonging to the group with the reliability which is the highest to be the update data.

5. A remote work supporting method executed by a remote work supporting system for supporting work of a target computer apparatus to be executed remotely by a plurality of operators, the remote work supporting method comprising:
creating, by a first computer, virtual machines providing respective virtual computer environments for the target computer apparatus by respectively associating the virtual machines with the respective operators and provide each of the created virtual machines to each terminal of the corresponding operators;

receiving respective update content from each of the terminals, which is input data consisting of at least a plurality of characters acquired from each terminal for updating content of the target computer;

store the received update content sequentially in one or more sections in buffers that respectively correspond to each of the operators;

for each corresponding section in each respective buffer, compare each character to determine whether the input data of the sections match each other; and upon determining a majority of the sections match each other, store the update content of the matching sections in a first storage of the second computer as update data for the target computer, wherein update data is reflected in the target computer.

* * * * *